United States Patent [19]

Brick et al.

[11] 4,150,082

[45] Apr. 17, 1979

[54] PROCESS FOR EXTRUDING POLYMER MATERIALS FOR HIGH VOLTAGE CABLES

[75] Inventors: Nils P. O. Brick, Huddinge; Karl A. Öberg, Sundbyberg, both of Sweden

[73] Assignee: Telefonaktiebolaget L M Ericsson, Stockholm, Sweden

[21] Appl. No.: 813,839

[22] Filed: Jul. 8, 1977

[30] Foreign Application Priority Data

Jul. 23, 1976 [SE] Sweden ............................... 7608412

[51] Int. Cl.² .............................................. B29F 3/10
[52] U.S. Cl. ...................................... 264/174; 264/237; 264/348; 425/113
[58] Field of Search ............... 264/174, 173, 237, 348; 425/113, 379 R

[56] References Cited

U.S. PATENT DOCUMENTS

| | | |
|---|---|---|
| 2,732,592 | 1/1956 | Tunnicliff et al. ................... 264/174 |
| 3,121,255 | 2/1964 | Henning et al. ..................... 425/113 |
| 3,227,786 | 1/1966 | Cohen ................................... 264/174 |
| 3,277,225 | 10/1966 | Heard, Jr. ............................ 425/113 |
| 3,538,207 | 11/1970 | Toole ................................... 264/174 |

*Primary Examiner*—Jeffery R. Thurlow
*Attorney, Agent, or Firm*—Hane, Roberts, Spiecens & Cohen

[57] ABSTRACT

A method for extruding polymer materials for high voltage cables includes cooling the conductor of the cable before the extrusion of all the polymer material thereon in order to mechanically stabilize the material.

4 Claims, 5 Drawing Figures

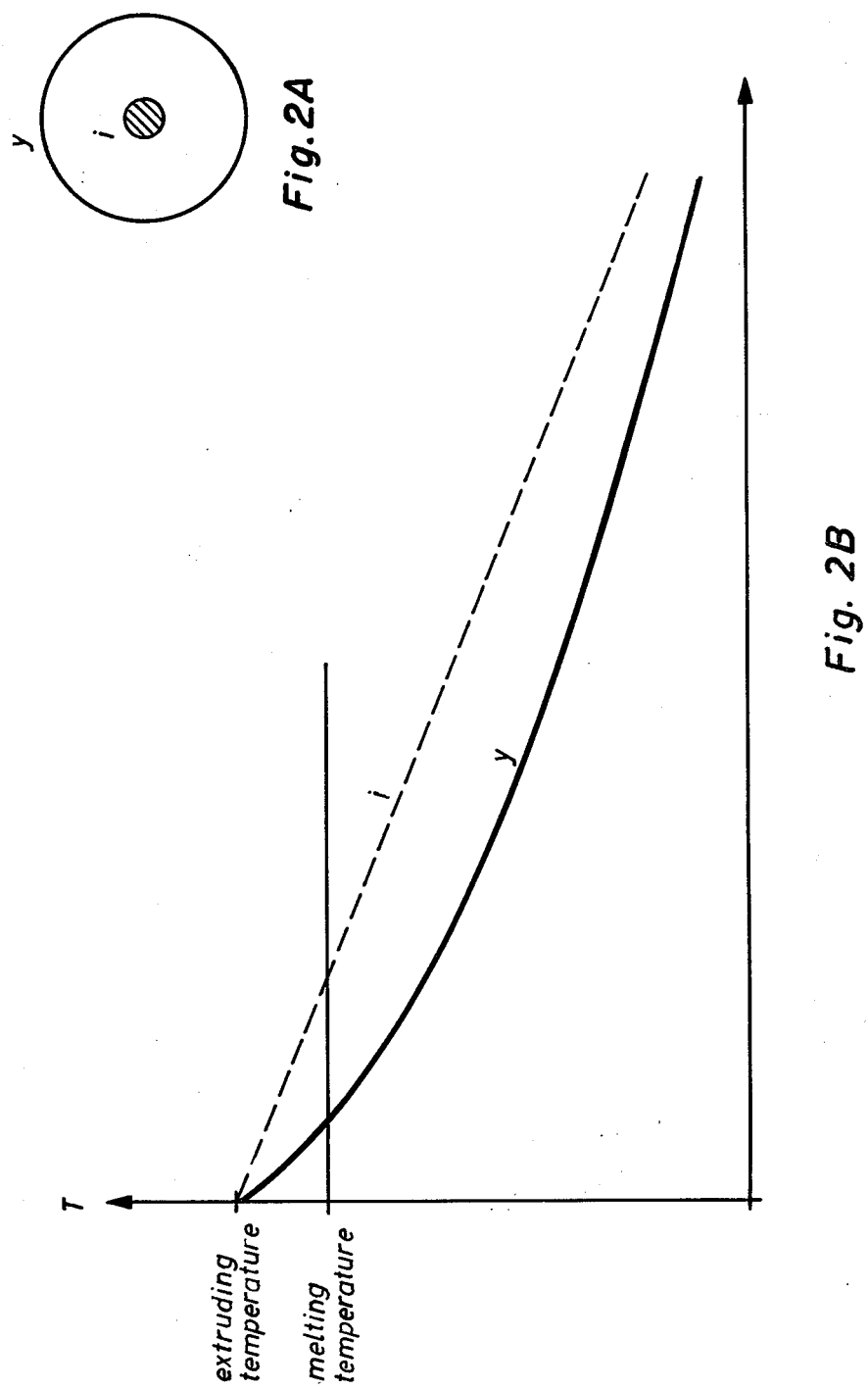

# PROCESS FOR EXTRUDING POLYMER MATERIALS FOR HIGH VOLTAGE CABLES

FIELD OF INVENTION

The present invention relates to a method for producing high voltage cable provided with extruded polymer material such as polyolefins polyethylene, ethylene propylene elastomers and the like.

PRIOR ART

These polymer materials differ from so called cross linked polymer material in that they do not contain peroxides or have not gone through another treatment which chemically cross links the polymer chains of the material to each other. These non cross-linked materials are thus not mechanically stabilized at temperatures above the melting point and can easily be deformed. This is, for example, the case immediately after the extrusion and the problem is that for thicker cable insulations vertical lines are required as these insulation layers owing to the influence of the attraction of gravity cannot be centered and the cable cannot be kept round in normal horizontal or chain lines which is a special problem with small conductor areas and thick insulation layers. A too rapid cooling of the cable after the extrusion entails, however, other complications. For example, a hard cover arises in the outer layer of the insulation through which gases which might be generated cannot force their way out. Furthermore, great temperature gradients can give rise to disastrous inner mechanical stresses in the insulation layer.

SUMMARY OF THE INVENTION

The present invention seeks to make it possible to effect extrusion in non-vertical lines without deformation and eccentricity taking place. When extruding polymer materials, the temperature has to exceed the melting point, or, more precisely the melting area. Especially for crystalline or partially crystalline materials such as polyethylene, the temperature area in question is very narrow which entails that the material quickly becomes easy liquid and thereby easily deformable. In the present method the great viscosity change when passing the melting point is utilized, so that the viscose extrudate is cooled to such a temperature that the material quickly becomes mechanically stabilized.

According to the present method cooling of the conductor occurs with or without a covered inner semi-conductive layer before the extrusion of the remaining material of polymer character. Then the material is mechanically stabilized starting from the inner conductor. This is necessary, especially for thin conductors, if deformations are to be avoided.

BRIEF DESCRIPTION OF THE DRAWINGS

The invention is described more in detail below with reference to the accompanying drawings in which FIG. 1 diagrammatically shows the principle of extrusion in a conventional extruding line with connected extruders, FIG. 2A shows a cross-section of a high-voltage cable, FIG. 2B is a graph showing the temperature curves for the cable along the extruding line with a conventional method.

DETAILED DESCRIPTION

Figure 1:
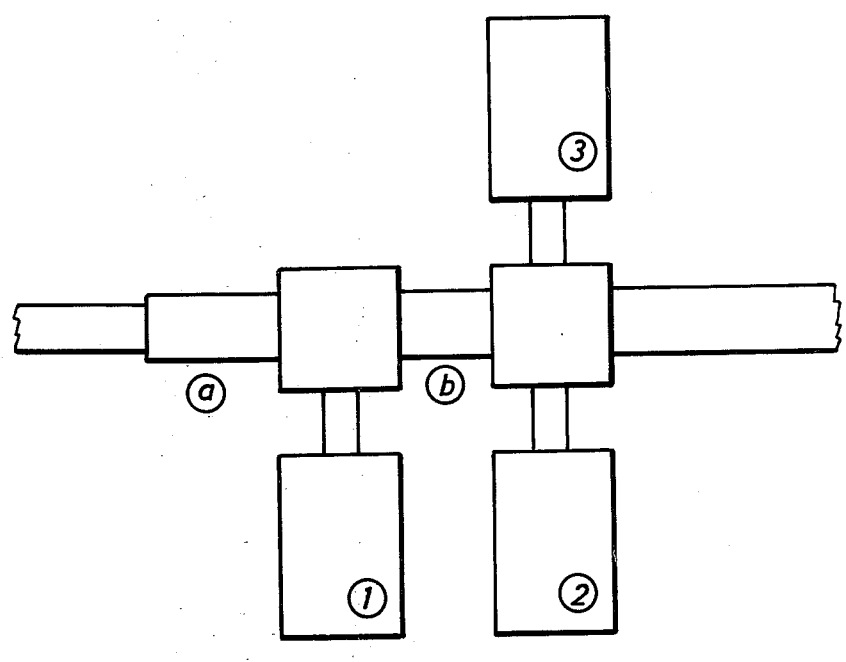

The principle for producing high voltage cable according to the prior art is made clear in FIG. 1 for a conventional extruding line with connected extruders 1, 2 and 3 and the cooling zones a and b. The conductor is covered with an inner semi-conductive layer in the extruder 1, is provided with an insulating layer in extruder 2 and with an outer semi-conductive layer in extruder 3. According to the invention cooling occurs before the end of extrusion. It can be carried out according to the following alternative.

(1) Cooling of the conductor is carried out in the cooling zone a
(2) Cooling of the conductor with applied inner semi-conductive layer is carried out in the cooling zone b
(3) Cooling is carried out both in the cooling zones a and b.

When the different alternatives will be used depends on the construction and the thickness of the cable. The extrusion is finished with a further cooling in accordance with the conventional method.

Figure 3A:
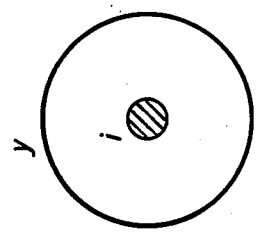
FIG. 3A shows the cross-section of the high-voltage cable and FIG. 3B is a graph which shows the corresponding temperature curves with a method according to the invention.
Figure 3B:
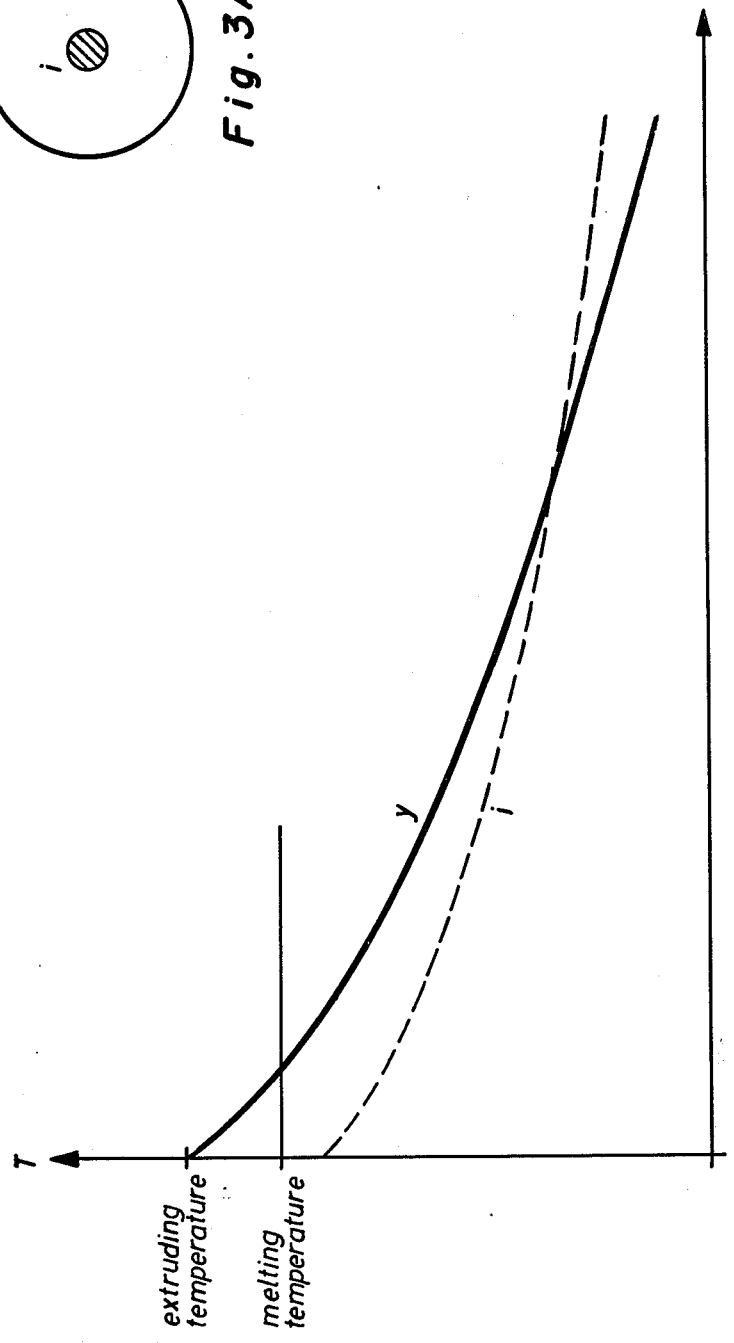

FIG. 2 shows a cross-section of a high voltage cable according to the above with its inner semi-conductive layer i and outer semi-conductive layer y and intermediate insulating layer and the temperature curves for layers i and y along the extruding line with a conventional extruding method. FIG. 3 shows the corresponding temperature curves with an extruding method according to the invention.

We claim:

1. In the method for manufacturing high voltage cable by extruding an inner layer of a cross-linkable polymeric, semi-conductive material on a central conductor followed by the extrusion of an intermediate layer of insulating material and an outer layer of semi-conductive material, the improvement comprising cooling the cable before the extrusion of the intermediate and outer layers onto the cable to a temperature below the melting point of the inner layer of material and at a cooling rate and duration to mechanically stabilize the polymeric material thereof upon extrusion whereby concentric and non-deformed cable is produced.

2. The method of claim 1 wherein the central conductor is cooled before the extrusion thereon of the inner layer of semi-conductive material whereby the temperature of the extruded outer layer will initially exceed the melting temperature whereas the temperature of the inner layer will be less than the melting temperature initially but will exceed the temperature of the outer layer due to said cooling.

3. The method of claim 2 wherein the central conductor with the inner layer is cooled before the extrusion thereon of the intermediate and outer layers whereby the temperature of the extruded outer layer will initially exceed the melting temperature whereas the temperature of the inner layer will be less than the melting temperature initially but will exceed the temperature of the outer layer due to said cooling.

4. The method of claim 1 wherein the central conductor with the inner layer is cooled before the extrusion of the intermediate and outer layers whereby the temperature of the extruded outer layer will initially exceed the melting temperature whereas the temperature of the inner layer will be less than the melting temperature initially but will exceed the temperature of the outer layer due to said cooling.

* * * * *